US008923617B2

(12) United States Patent
Yamaji et al.

(10) Patent No.: US 8,923,617 B2
(45) Date of Patent: Dec. 30, 2014

(54) IMAGE PROCESSING DEVICE, IMAGE PROCESSING METHOD, AND IMAGE PROCESSING PROGRAM (75) Inventors: Kei Yamaji, Tokyo (JP); Tetsuya Matsumoto, Tokyo (JP); Kazuma Tsukagoshi, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 218 days.

(21) Appl. No.: 13/525,827

(22) Filed: Jun. 18, 2012

(65) Prior Publication Data

US 2012/0321187 A1 Dec. 20, 2012

(30) Foreign Application Priority Data

Jun. 20, 2011 (JP) ................................. 2011-136692

(51) Int. Cl.
*G06K 9/34* (2006.01)
*H04N 1/00* (2006.01)
(52) U.S. Cl.
CPC ....... *H04N 1/00137* (2013.01); *H04N 1/00448* (2013.01); *H04N 1/00175* (2013.01); *H04N 1/00456* (2013.01); *H04N 1/00161* (2013.01); *H04N 1/00143* (2013.01); *H04N 1/00196* (2013.01); *H04N 1/00453* (2013.01); *H04N 1/00461* (2013.01)
USPC ........... 382/173; 382/112; 382/284; 382/294; 358/537; 358/540; 358/450
(58) Field of Classification Search
USPC .......... 382/175, 282, 284, 294; 358/538, 540, 358/450
See application file for complete search history.

(56) References Cited

U.S. PATENT DOCUMENTS

| 5,796,428 | A | 8/1998 | Matsumoto et al. |
| 7,050,070 | B2* | 5/2006 | Ida et al. ........................ 345/629 |
| 7,382,380 | B1* | 6/2008 | Crosby et al. ................... 345/619 |
| 7,623,738 | B2* | 11/2009 | De Haan ......................... 382/299 |
| 8,055,080 | B2* | 11/2011 | Isomura et al. ................ 382/224 |
| 8,098,896 | B2* | 1/2012 | Isomura et al. ................ 382/106 |
| 8,139,826 | B2* | 3/2012 | Ryuto et al. ................... 382/118 |
| 8,279,296 | B2* | 10/2012 | Kimura et al. ............. 348/218.1 |
| 8,423,559 | B2* | 4/2013 | Matsushita et al. ........... 707/752 |

(Continued)

FOREIGN PATENT DOCUMENTS

| JP | 3528214 | 5/2004 |
| JP | 2007-200060 | 8/2007 |
| JP | 4127178 | 7/2008 |
| JP | 2010-108165 | 5/2010 |

OTHER PUBLICATIONS

JP Office Action dated Nov. 19, 2013, with partial English Translation; Application No. 2012-135517.

*Primary Examiner* — Yosef Kassa
(74) *Attorney, Agent, or Firm* — Young & Thompson (57) ABSTRACT

An image processing device includes an image acquiring section for acquiring images; a mount number setting section for setting a mount number for mounts; an image dividing section for dividing the acquired images into a predetermined number of groups based on accessory information of the images, with the number of groups being equal to the mount number; and an image arranging section for arranging images included in each group after division on each corresponding mount. The image dividing section divides the images into the groups so that the number of images included in each group is not more than the upper limit number of images capable of being arranged on the corresponding mount.

24 Claims, 7 Drawing Sheets

(56) References Cited

U.S. PATENT DOCUMENTS

| | | | |
|---|---|---|---|
| 8,478,111 B2* | 7/2013 | Stankiewicz et al. | 386/278 |
| 8,553,110 B2* | 10/2013 | Johansson | 348/241 |
| 8,571,275 B2* | 10/2013 | Ryuto et al. | 382/118 |
| 8,781,175 B2* | 7/2014 | Wang et al. | 382/112 |

* cited by examiner

| GROUP | 1 | 2 | 3 | 4 | 5 | 6 | 7 |
|---|---|---|---|---|---|---|---|
| NUMBER OF IMAGES | 4 | 3 | 12 | 2 | 3 | 7 | 8 |

FIG. 4B

| GROUP | 1 | 2 | 3 | 4 | 5 | 6 | 7 |
|---|---|---|---|---|---|---|---|
| NUMBER OF IMAGES | 4 | 3 | 12 | 2 | 3 | 7 | 8 |

FIG. 4C

| GROUP | 1 | 2 | 3 | 4 | 5 | 6 | 7 |
|---|---|---|---|---|---|---|---|
| NUMBER OF IMAGES | 4 | 3 | 7 | 5 | 5 | 7 | 8 |

FIG. 5A

| GROUP | 1 | 2 | 3 | 4 | 5 | 6 | 7 |
|---|---|---|---|---|---|---|---|
| NUMBER OF IMAGES | 4 | 5 | 12 | 2 | 7 | 7 | 8 |

FIG. 5B

| GROUP | 1 | 2 | 3 | 4 | 5 | 6 | 7 |
|---|---|---|---|---|---|---|---|
| NUMBER OF IMAGES | 7 | 7 | 7 | 6 | 6 | 6 | 6 |

IMAGE PROCESSING DEVICE, IMAGE PROCESSING METHOD, AND IMAGE PROCESSING PROGRAM

BACKGROUND OF THE INVENTION

The present invention relates to an image processing device, an image processing method and an image processing program for arranging a plurality of images on each of mounts.

The photo book is a service with which a user transmits a plurality of images (image data) captured by, for example, a digital camera to a service provider through the Internet to create a photo album having a layout desired by the user. When creating a photo book, the user can select a desired template from a plurality of layout templates in which positions where images can be arranged are previously determined and determine as desired the number of pages of the photo book, images to be included in each page, and the layout of the images in each page.

A conventionally known photo book-creating method involves classifying images into groups in consideration of the continuity and relationship of the images, for example, based on the shooting time and arranging images included in each of the groups on their corresponding pages.

For example, JP 3528214 B proposes an image display method comprising setting classifying conditions for each page based on accessory information data concerning capture of image data and attached to the image data upon the capture thereof, classifying the image data for each page based on the accessory information data and the conditions, and displaying the classified image data on a display screen for each page.

JP 4127178 B proposes an image processing device in which images are allocated to each page based on the shooting date or shooting date and time and, if it is possible to allocate images to the same page, a correction is made so that the images are allocated to the same page.

JP 2010-108165 A proposes an album print order reception machine which receives an inputted total number of pages and sets an image layout in each page based on the received total number of pages.

SUMMARY OF THE INVENTION

Conventional photo book-creating procedures are described below by way of specific examples.

Figure 11:
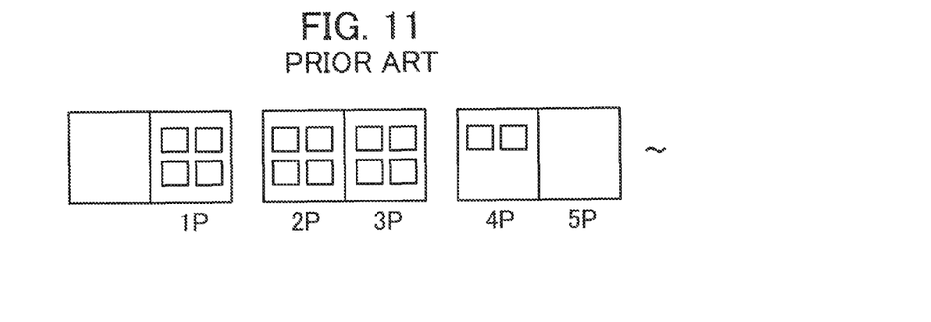
FIG. 11 is a conceptual diagram illustrating an example of the configuration in each page of a photo book.

The first creating procedure involves, after a user selects images to be used in a photo book and designates the number of pages of the photo book, arranging the selected images in order from the first page as shown in FIG. 11. For example, after the designation of the number of pages of the photo book as 10P (P is an abbreviation of page), four images are arranged on each of 1P to 3P and two images on 4P as shown in FIG. 11. If there remains no image to be arranged, 5P to 10P having no image arranged are blank pages.

Figure 12:
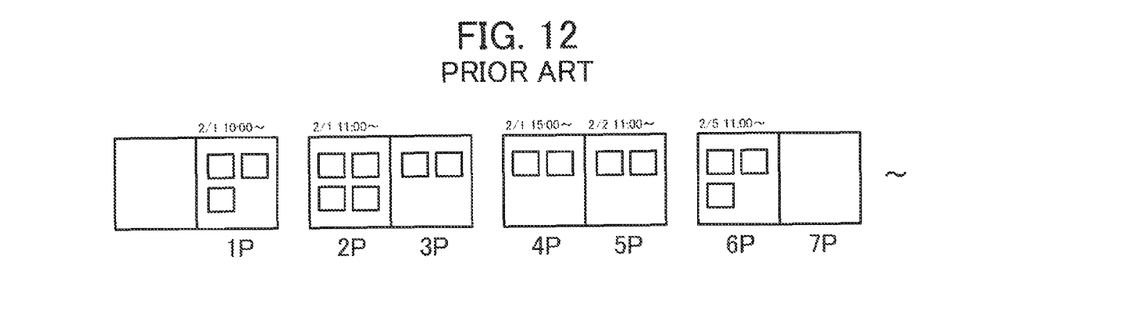
FIG. 12 is a conceptual diagram illustrating another example of the configuration in each page of a photo book.

The second creating procedure involves, after the user selects images and designates the number of pages, dividing the images into groups based on the shooting time and arranging images included in each group on the corresponding pages from the first page as shown in FIG. 12. As in the above case, after the designation of the number of pages as 10P, three images are arranged on 1P, four images on 2P, two images on each of 3P to 5P, and three images on 6P as shown in FIG. 12. If there remains no image to be arranged, 7P to 10P having no image arranged are blank pages.

Figure 13:
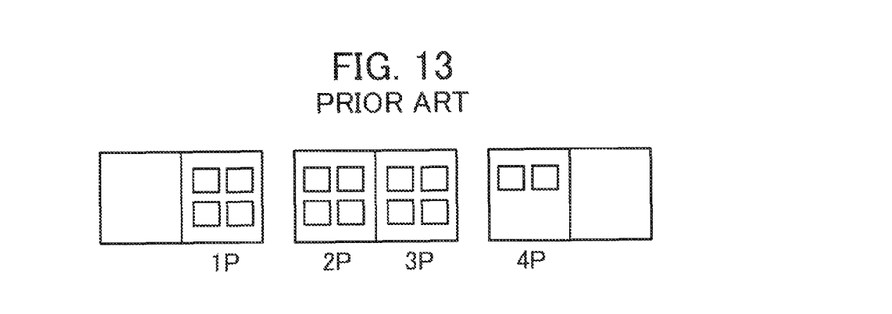
FIG. 13 is a conceptual diagram illustrating still another example of the configuration in each page of a photo book.

The third creating procedure involves, after the user selects images, arranging the selected images in order from the first page as shown in FIG. 13. For example, four images are arranged on each of 1P to 3P and two images on 4P, as shown in FIG. 13. If there remains no image to be arranged, 12 to 4P having the images arranged thereon are only included in the photo book and blank pages having no image arranged thereon are not included in the photo book.

The fourth creating procedure involves, after the user selects images, dividing the selected images into groups based on the shooting time and arranging in order images included in each group from the first page. Also in this case, the pages having images arranged thereon are only included in the photo book and blank pages are not included therein.

The photo book is usually created by the first or third creating procedure or the second or fourth procedure which involves dividing a plurality of images into groups based on the shooting time and arranging them on the corresponding pages.

According to the first and third creating procedures, images cannot be arranged on corresponding pages after dividing them into groups or pages in view of the shooting time. According to the first creating procedure, the photo book inevitably includes unnecessary blank pages. In contrast, according to the second and fourth creating procedures, images can be arranged on corresponding pages after dividing them into groups in view of the shooting time.

In the case of the second creating procedure, however, manual edition is necessary to eliminate blank pages in the latter part of a photo book. According to the fourth creating procedure, the number of pages of a photo book is automatically determined by the number of images and therefore the user cannot create a photo book of a desired number of pages by designating the number of pages of the photo book. The number of pages is usually proportional to the price and therefore the situation that the user cannot designate the number of pages is an important issue.

An object of the present invention is to provide an image processing device, an image processing method and an image processing program capable of dividing images into groups in view of the continuity and relationship of the images and creating a photo book with a predetermined number of pages without having blank pages.

In order to achieve the above object, the present invention provides an image processing device for arranging a plurality of images on each of mounts, the image processing device comprising:

an image acquiring section for acquiring the plurality of images;

a mount number setting section for setting a mount number for the mounts;

an image dividing section for dividing the plurality of images acquired in the image acquiring section into a predetermined number of groups based on accessory information of the plurality of images, with the predetermined number being equal to the mount number set in the mount number setting section; and an image arranging section for arranging images included in each of the predetermined number of groups after division in the image dividing section on each corresponding mount, wherein the image dividing section is adapted to divide the plurality of images into the predetermined number of groups so that a number of images included in each of the predetermined number of groups is not more than an upper limit number of images capable of being arranged on the corresponding mount.

The invention also provides an image processing method for arranging a plurality of images on each of mounts, the image processing method comprising:

an image acquiring step of acquiring the plurality of images;

a mount number setting step of setting a mount number for the mounts;

an image dividing step of dividing the plurality of images acquired in the image acquiring step into a predetermined number of groups based on accessory information of the plurality of images, with the predetermined number being equal to the mount number set in the mount number setting step; and an image arranging step of arranging images included in each of the predetermined number of groups after division in the image dividing step on each corresponding mount, wherein the image dividing step divides the plurality of images into the predetermined number of groups so that a number of images included in each of the predetermined number of groups is not more than an upper limit number of images capable of being arranged on the corresponding mount.

The invention also provides a computer readable recording medium having recorded thereon an image processing program for causing a computer to execute each step of the image processing method according to above.

According to the invention, images can be divided into groups based on accessory information of the images in view of the continuity and relationship of the images. It is also possible to create a photo book with a predetermined number of pages without having blank pages.

DETAILED DESCRIPTION OF THE INVENTION

The image processing device, image processing method and image processing program of the invention are described below in detail with reference to preferred embodiments shown in the accompanying drawings.

Figure 1:
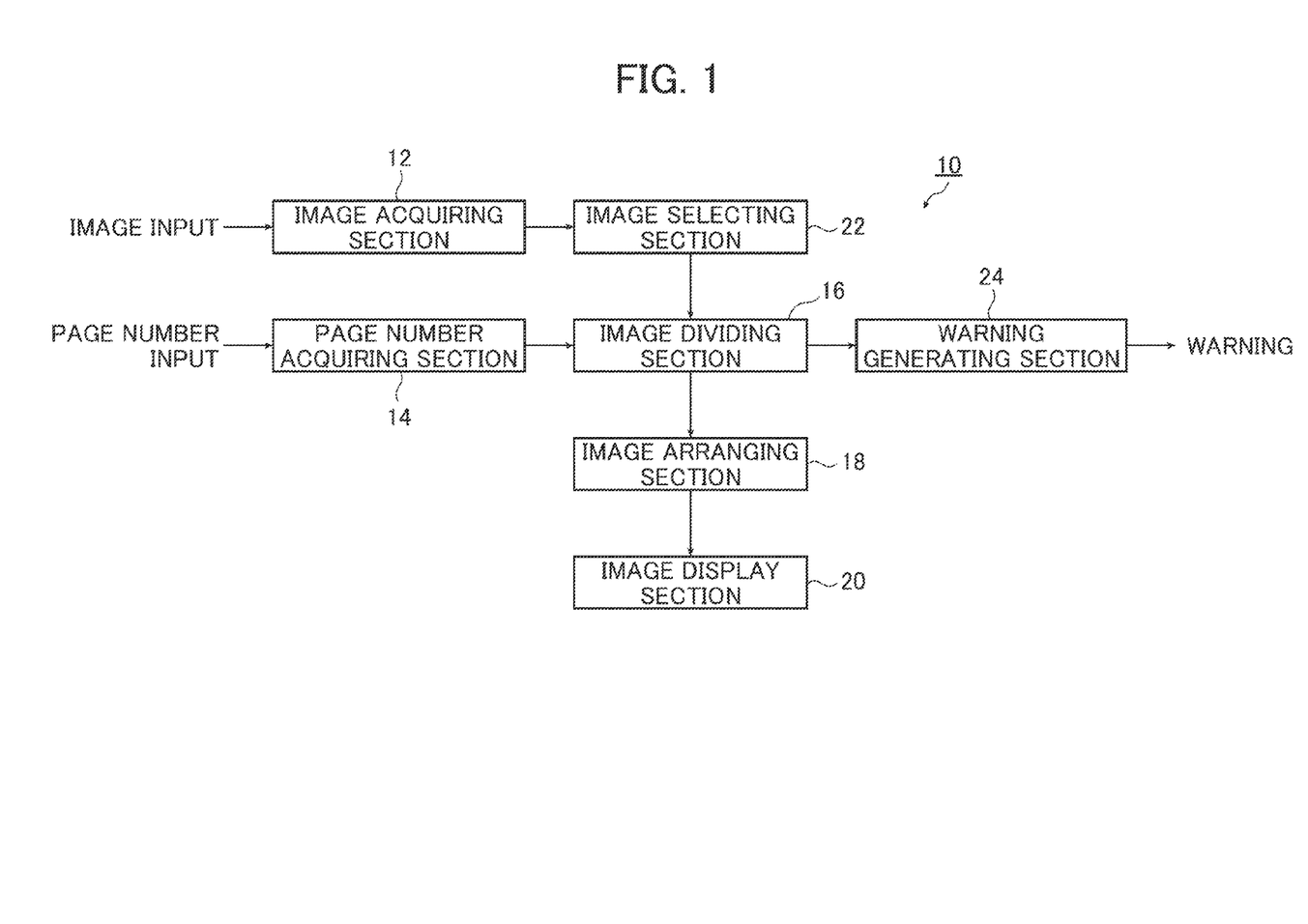
FIG. 1 is a block diagram illustrating the configuration of an embodiment of an image processing device of the invention.

FIG. 1 is a block diagram illustrating the configuration of an embodiment of the image processing device of the invention. The image processing device 10 shown in FIG. 1 automatically arranges a plurality of images on each page of a photo book having a predetermined number of pages and includes an image acquiring section 12, a page number acquiring section 14, an image dividing section 16, an image arranging section 18, an image display section 20, an image selecting section 22 and a warning generating section 24.

The image acquiring section 12 acquires a plurality of images (image data) which can be used in a photo book (be arranged on each page of the photo book). The image acquiring section 12 acquires such images through, for example, a USB (universal serial bus) memory, a memory card, an optical disk, or a wired/wireless network. Although not shown, images acquired in the image acquiring section 12 are stored, for example, in a storage device such as a hard disk.

The page number acquiring section 14 acquires the number of pages of a photo book that was inputted by a user. In the image processing device 10, upon the creation of the photo book, the user can designate the number of pages of the photo book the user is to create. The page number acquiring section 14 can use input means such as a mouse, a keyboard and a touch panel to operate the page number input screen displayed on the image display section 20 thereby designating the number of pages.

The image selecting section 22 is used to select one or more images to be actually used in the photo book from among a plurality of images acquired in the image acquiring section 12. In the image processing device 10 of the embodiment under consideration, the image dividing section 16 divides the images selected by the user through the image selecting section 22 into groups. Similarly to the page number acquiring section 14, the image selecting section 22 uses input means such as a mouse to operate the image selection screen.

The image selecting section 22 is not essential. In the image processing device having no image selecting section 22, the images acquired in the image acquiring section 12 may be divided into groups in the image dividing section 16. In other words, images to be divided into groups in the image dividing section 16, that is, images to be actually used in the photo book may only be acquired in the image acquiring section 12.

Based on accessory information of each image including shooting time and shooting position, the image dividing section 16 divides the images selected in the image selecting section 22 into a predetermined number of groups equal to the number of pages in the photo book that was acquired in the page number acquiring section 14. The image dividing section 16 divides or subdivides the images so that the number of images included in each group may be equal to or less than the upper limit number of images to be arranged on each corresponding page of the photo book.

The image arranging section 18 arranges the images included in each group after the division in the image dividing section 16 on each corresponding page of the photo book.

The image display section 20 displays each page of the photo book where the images were arranged in the image arranging section 18. The image display section 20 displays, for example, the above-described input screen and selection screen and a confirmation screen for confirming on which page of the photo book and at which position of the page each image is arranged.

When the user selects images through the image selecting section 22, the warning generating section 24 generates a warning if the number of images of the group corresponding to the selected images exceeds the upper limit number of images in the corresponding page or the group corresponding to the selected images is subjected to at least one of first exception processing and second exception processing. A warning is generated, for example, by displaying a warning message on the image display section 20 or as an aural warning.

When the user changes the number of pages of the photo book inputted through the page number acquiring section 14, the warning generating section 24 generates a warning if the number of images in each group exceeds the upper limit number of images in the corresponding page or at least one of the first exception processing and the second exception processing is performed. The warning generating section 24 is not essential.

Figure 2:
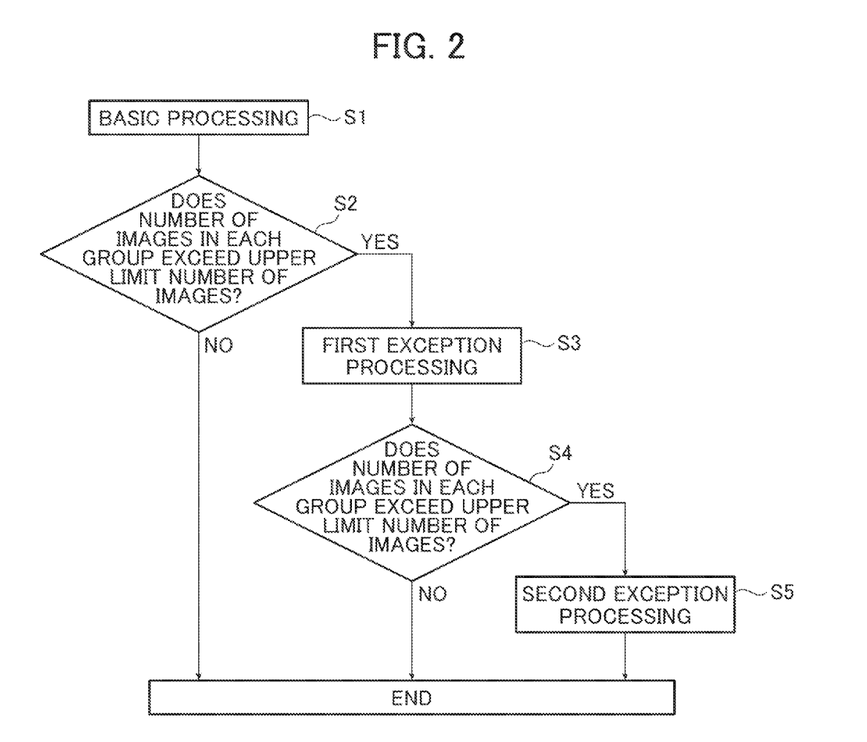
FIG. 2 is a flowchart illustrating an example of the operation of the image processing device.

Next, the operation of the image processing device 10 in the case of creating the photo book according to the image processing method of the invention is described with reference to the flowchart shown in FIG. 2.

In the image processing device 10, the image acquiring section 12 acquires a plurality of images that can be arranged on each page of the photo book. The page number acquiring section 14 acquires the number of pages (designated number of pages) of the photo book that was inputted by a user. After the acquisition of the plurality of images, the user selects one or more images to be actually used in the photo book from among the plurality of images acquired in the image acquiring section 12 through the image selecting section 22.

Figure 3:
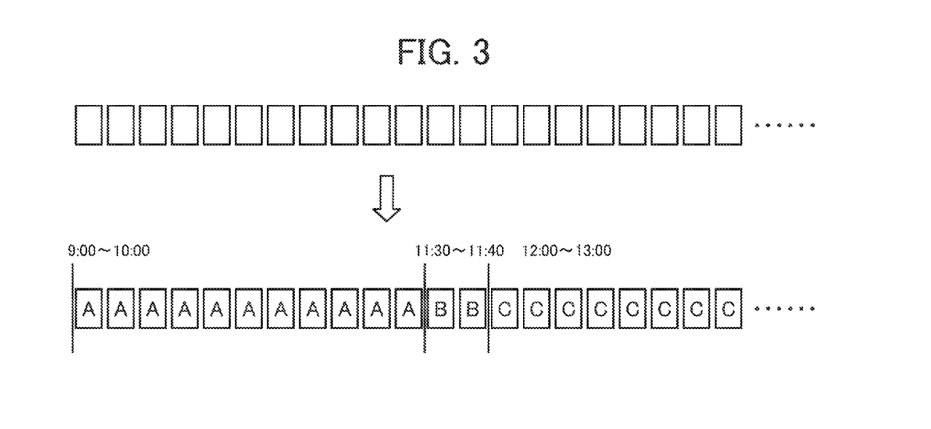
FIG. 3 is a conceptual diagram illustrating how to divide a plurality of images into groups based on accessory information.

After the selection of the images to be used in the photo book, the user performs basic processing in the image dividing section 16 to divide, as shown in FIG. 3, the selected images into a predetermined number of groups corresponding to the designated number of pages that was acquired, based on the accessory information of the images (Step S1).

When the shooting time is used as accessory information, the image dividing section 16 divides the acquired plurality of images into image groups having comparatively large shooting intervals therebetween. In the example shown in FIG. 3, the plurality of images are divided into shooting time groups of 9:00-10:00, 11:30-11:40, 12:00-13:00 and the like based on the shooting time in the accessory information. When the shooting position is used as accessory information, the plurality of images are divided into groups differing in shooting position.

When images included in one group are to be arranged on one page of the photo book, the image dividing section 16 ends the division processing, for example, at a point in time when the number of groups reaches the designated number of pages. In this case, the remaining images are not used in the photo book. On the other hand, when the number of groups is less than the designated number of pages after the end of the division processing, the image dividing section 16 regards the number of groups after the division processing as the number of pages and ends the processing.

Subsequently, the image dividing section 16 checks whether the number of images included in each group (number of images) exceeds the upper limit number of images that can be arranged on each page of the photo book (Step S2). The image dividing section 16 ends the processing when the number of images in all the groups does not exceed the upper limit number of images ("No" in Step S2) and proceeds to Step S3 when the number of images in one of the groups exceeds the upper limit number of images ("Yes" in Step S2).

The image dividing section 16 performs the first exception processing upon the detection of a group (excess group) in which the number of images exceeds the upper limit number of images (Step S3).

More specifically, the image dividing section 16 performs the first exception processing to check whether images included in two or more groups which are adjacent to the excess group and in which the total number of images does not exceed the upper limit number of images can be combined into one group. Upon the detection of two or more groups capable of being combined into one group, the image dividing section 16 combines the images included in these groups into one group. The processing proceeds to Step S4 when such groups cannot be detected.

Upon the detection of a plurality of groups that can be combined into one group, the image dividing section 16 gives priority to groups having the smallest total number of images after the combination into one group and combines images included in these groups into one group. In the case of combining two or more groups into one group, the image dividing section 16 combines from a group which is farthest from the excess group in consideration of the image continuity and relationship.

The image dividing section 16 subdivides the images included in the excess group into the excess group and its adjacent groups so that the number of images included in each group is not more than the upper limit number of images. The number of images in each group can be thus adjusted without changing the total number of groups by performing image combination and subdivision among the groups.

Figure 4A:
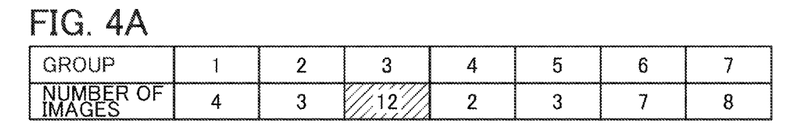
FIGS. 4A to 4C are conceptual diagrams illustrating how to perform first exception processing.

For example, a case is considered in which the result shown in FIG. 4A is obtained by the basic processing. FIG. 4A illustrates the case in which the designated number of pages is 7 and the number of images on each page is limited to 1 to 8 (the upper limit number of images is 8).

Referring to FIG. 4A, the number of groups after the division processing is 7 which is the same number as the designated number of pages but the number of images in group 3 is 12 and exceeds the upper limit number of 8.

Figure 4B:
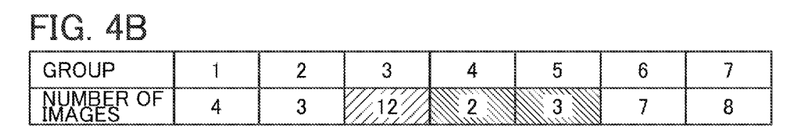

In this case, the image dividing section 16 performs the first exception processing to check whether images included in two or more groups which continue from group 2 or 4 adjacent to group 3 and in which the total number of images does not exceed the upper limit number of 8 can be combined into one group. In this case, as shown in FIG. 4B, groups 1 and 2 can be combined into one group as long as the number of images does not exceed the upper limit number of 8 and groups 4 and 5 can also be combined.

As described above, the image dividing section 16 gives priority to groups having the smallest total number of images after the combination into one group and combines the images included in groups 4 and 5 into one group, more specifically two images included in group 4 and three images included in group 5 into one group 5. In this way, the number of images included in group 4 becomes 0, whereas the number of images included in group 5 becomes 5.

Figure 4C:
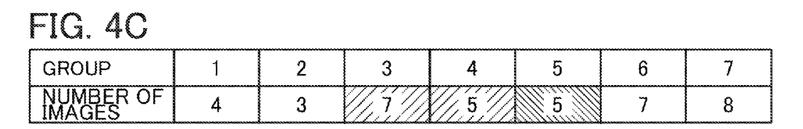

The image dividing section 16 subdivides twelve images included in group 3 into groups 3 and 4 so that the number of images included in each group is not more than the upper limit number of 8. For example, the number of images in group 3 is 7 and the number of images in group 4 is 5 as shown in FIG. 4C, and the number of images in groups 3 and 4 can be thus reduced below the upper limit number of 8.

The same applies to the combination of groups 1 and 2. In this case, the images in groups 1 and 2 are combined as group 1 and the images in group 3 are subdivided into groups 2 and 3. Two groups are combined together in the above example but three or more groups may be combined together.

The image dividing section 16 may detect one or more groups adjacent to the excess group which satisfy the condition that the total number of images after the combination with the excess group does not exceed the sum of the upper limit numbers of images of the excess group and the one or more groups, and subdivide the images included in the excess group into the excess group and the one or more detected groups so that the number of images included in each group is not more than the upper limit number of images. The processing proceeds to Step S4 if one or more groups satisfying the condition that the total number of images after the combination with the excess group does not exceed the sum of the upper limit numbers of images of the excess group and the one or more groups cannot be detected.

After the end of the first exception processing, the image dividing section 16 checks again whether the number of images in each group does not exceed the upper limit number of images (Step S4). The image dividing section 16 ends the processing when the number of images in all the groups does not exceed the upper limit number of images ("No" in Step S4) and proceeds to Step S5 when the number of images in one of the groups exceeds the upper limit number of images ("Yes" in Step S4).

Subsequently, the image dividing section 16 performs the second exception processing upon the detection of the excess group (Step S5).

More specifically, the image dividing section 16 performs the second exception processing to uniformly subdivide a plurality of images into a predetermined number of groups irrespective of the accessory information so that the number of images included in each group is not more than the upper limit number of images.

Figure 5A:
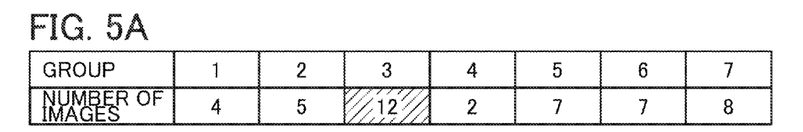
FIGS. 5A and 5B are conceptual diagrams illustrating how to perform second exception processing.

For example, a case is considered in which the result shown in FIG. 5A is obtained by the basic processing. The designated number of pages is 7 and the number of images on each page is limited to 1 to 8 (the upper limit number of images is 8) as in the above example and group 3 is an excess group.

In this case, the total number of images after the combination of the images in groups 4 and 5 into one group is 9 and therefore these images cannot be combined into one group. The same applies to groups 1 and 2. That is, further combination or subdivision cannot be performed.

Figure 5B:
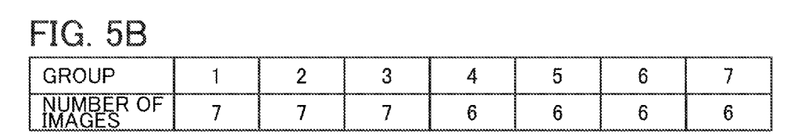

If a group capable of combination or subdivision cannot be thus detected, the image dividing section 16 uniformly subdivides, as shown in FIG. 5B, a plurality of images into seven groups irrespective of the accessory information of the images so that the number of images included in each group is not more than the upper limit number of 8. In the example shown in FIG. 5B, the number of images in groups 1 to 3 is 7 and the number of images in groups 4 to 7 is 6.

The second exception processing can reliably divide a plurality of images into a predetermined number of groups equal to the designated number of pages. However, the accessory information is not taken into account in the division and therefore the second exception processing is inferior in the division accuracy (continuity and relationship of the images) to the basic processing and the first exception processing.

Therefore, when the shooting time is uses as accessory information, the image dividing section 16 shifts, based on the shooting time information, one or more images adjoining the boundary between the two adjacent groups after the subdivision to a group including images having a closer shooting time so that the number of images included in each group is not more than the upper limit number of images. The division accuracy can be thus improved also when the second exception processing is performed.

Figure 6A:
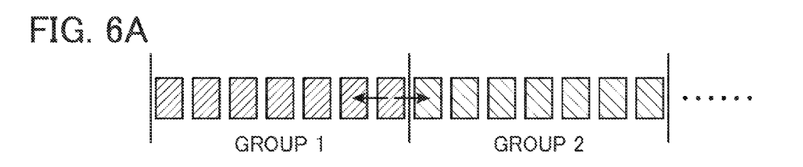
FIGS. 6A and 6B are conceptual diagrams illustrating how to shift images between two adjacent groups when the second exception processing is performed.
Figure 6B:
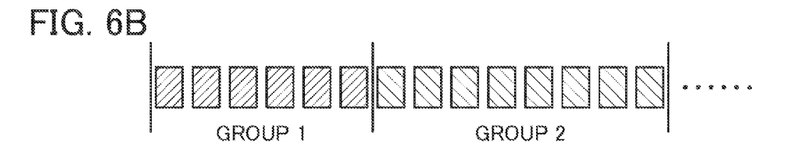

As shown in FIG. 6A, in the boundary between groups 1 and 2, the shooting time of the last image in group 1 is compared with that of the images on both sides, that is, the second image from the end of group 1 and the first image in group 2. If the shooting time of the last image in group 1 is closer to that of the first image in group 2 than the second image from the end of group 1, the last image in group 1 is shifted to the first position of group 2 as shown in FIG. 6B.

The image to be considered for shifting is not limited to the last image in group 1 and the user may compare the shooting time of the second image from the end of group 1 with that of the third image from the end of group 1 and the first image in group 2 and determine whether the last image and the second image from the end of group 1 are to be shifted to group 2. The same applies to the third image from the end of group 1 or an image more distant therefrom and any image in group 2. In addition, the same also applies between other adjacent groups.

Figure 7:
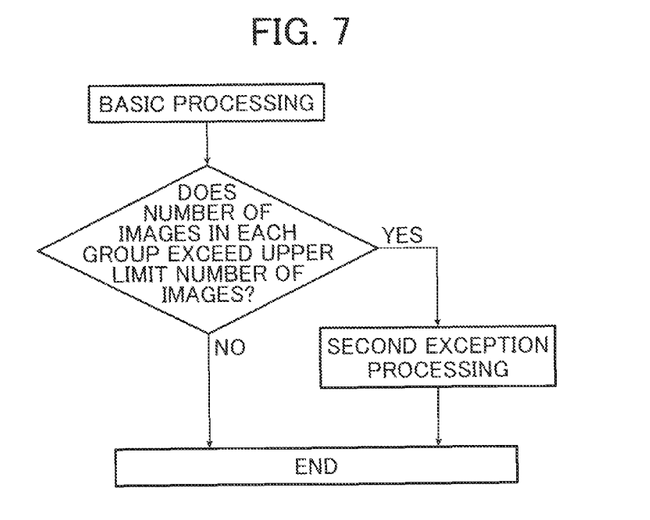
FIG. 7 is a flowchart illustrating another example of the operation of the image processing device.
Figure 8A:
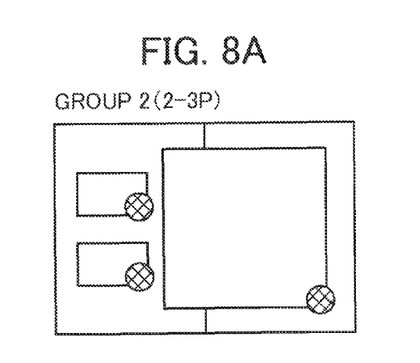
FIGS. 8A to 8D are conceptual diagrams illustrating examples of a display screen of an image display section.
Figure 8B:
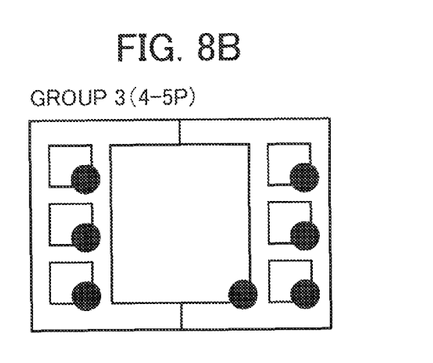
Figure 8C:
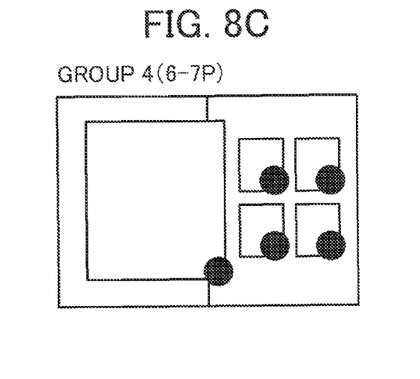
Figure 8D:
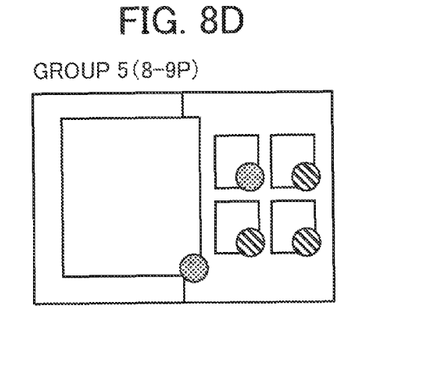

The above example refers to the case where the image dividing section 16 processes in the order of the basic processing, the first exception processing and the second exception processing. However, the basic processing and the second exception processing may be performed in this order without performing the first exception processing as shown in the flowchart of FIG. 7.

After the end of the image division processing, the image arranging section 18 arranges the images included in each group after the division on each corresponding page of the photo book. Then, the image display section 20 displays the pages of the photo book having images arranged thereon, for page by page or for every two pages.

The image processing device 10 can thus divide a plurality of images into groups based on the accessory information of the images in view of the continuity and relationship of the images. It is also possible to create a photo book whose number of pages is designated by the user without having blank pages.

Next, the display screen of the image display section 20 upon the image subdivision is described.

The image processing device 10 has the confirmation function for enabling the user to see the display screen of the image display section 20 and confirm the image subdivision when images are subdivided as in the first and second exception processing.

FIGS. 8A to 8D are conceptual diagrams illustrating examples of the display screen of the image display section. The display screen of the image display section 20 shown in FIGS. 8A to 8D show each page of the photo book corresponding to each group having undergone the first exception processing as shown in FIG. 4C. FIGS. 8A to 8D illustrate groups 2 to 5 shown in FIG. 4C over two pages of the photo book.

In the example of FIG. 4C, two images in group 4 and three images in group 5 which are to be subdivided are combined into group 5 after the subdivision. In other words, group 5 after the reconstruction includes five images. Twelve images in group 3 before the subdivision are subdivided into groups 3 and 4 after the subdivision. In other words, group 3 after the reconstruction includes seven images in group 3 before the subdivision and group 4 includes five images in group 3 before the subdivision.

When the image subdivision is performed, the image display section 20 displays groups which included images before the subdivision in an identifiable manner. In the examples of FIGS. 8A to 8D, the images included in the same group before the subdivision are identified by the same mark. In other words, the user can see the screen in each page of the photo book displayed on the image display section 20 and confirm in which group the images arranged on each page after the subdivision were included before the subdivision.

Marking is not an essential method to identify a group which included each image before the subdivision and the group may be displayed so that the user can identify the group before the subdivision by, for example, changing the color of the image frame. This example refers to the case where the images are subdivided by the first exception processing but may be likewise applied to the case where the images are subdivided by the second exception processing.

Next, the warning generating section 24 is described.

The image processing device 10 has the warning function for generating a warning to the user when the number of images of a group exceeds the upper limit number of images or at least one of the first exception processing and the second exception processing is performed.

Figure 9:
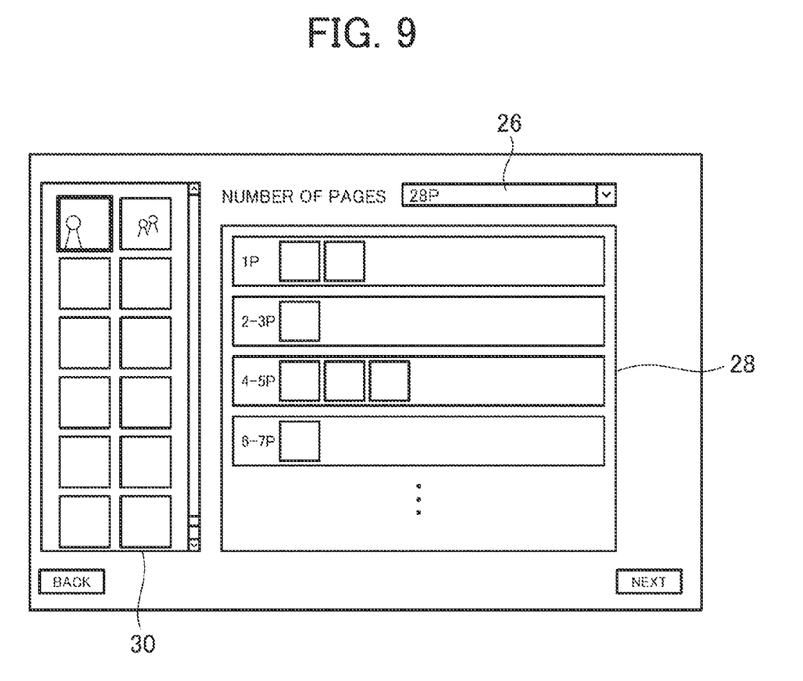
FIG. 9 is a conceptual diagram illustrating another example of the display screen of the image display section.

FIG. 9 is a conceptual diagram illustrating another example of the display screen of the image display section. The display screen of the image display section 20 shown in FIG. 9 displays the confirmation screen for confirming on which page of the photo book and at which position of the page each image is arranged. This display screen also includes the screen for inputting the number of pages and the image selection screen. The display screen shown in FIG. 9 includes a page number designation area 26, a group division result display area 28 and an image selection area 30.

The page number designation area 26 is provided in the upper central portion of the display screen. The page number designation area 26 is an area for designating the number of pages of a photo book to be created through the page number acquiring section 14. FIG. 9 refers to the example including a pull-down menu in which the number of pages that can be designated is set in advance. The user can use input means such as a mouse to select a desired number of pages from the pull-down menu.

The group division result display area 28 is provided in the right side region accounting for about two thirds of the display screen. The group division result display area 28 is an area for displaying the images included in each page corresponding to each group, for each of a predetermined number of groups into which the images were divided in the image dividing section 16 so that the predetermined number of groups is equal to the number of pages designated by the user. The group division result display area 28 displays the images included in the page corresponding to each group.

The image selection area 30 is provided in the left side region accounting for about one third of the display screen. The image selection area 30 is an area for displaying a plurality of images acquired in the image acquiring section 12 in order that the user may select images to be actually used in the photo book. The number of images that can be simultaneously displayed on the display screen is limited and therefore a predetermined number of images are only displayed on the display screen. The predetermined number of images displayed on the display screen can be changed by using a scroll bar provided in the image selection area 30.

When the user selects one or more images from a plurality of images displayed in the image selection area 30 through the image selecting section 22, the image dividing section 16 performs the basic processing to divide the images selected by the user into a predetermined number of groups corresponding to the designated number of pages based on the accessory information of the images. The group division result is displayed in the group division result display area 28. Each image is displayed so that the group before the subdivision can be identified.

Now, a case is considered in which the designated number of pages is 4 and the upper limit number of images per page of the photo book is 3.

Figure 10A:
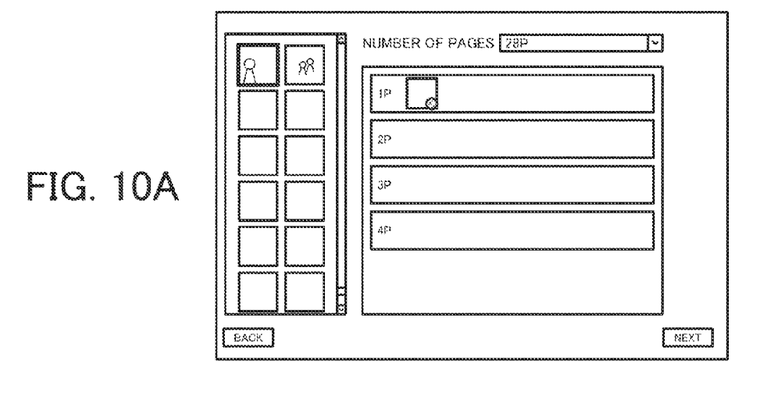
FIGS. 10A to 10C are conceptual diagrams illustrating display results on the image display section.

For example, when the user selects one image from a plurality of images displayed in the image selection area 30, the image dividing section 16 treats one image selected by the user as group 1. As shown in FIG. 10A, one image selected by the user is thus arranged on 1P corresponding to group 1 within the group division result display area 28 on the confirmation screen of the image display section 20.

Figure 10B:
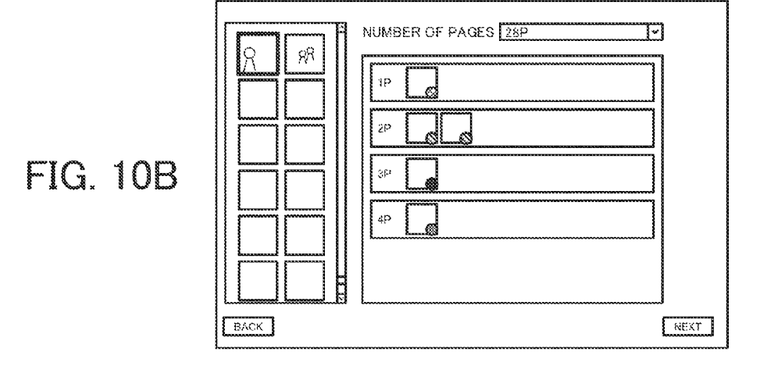

When the user selects five images, the image dividing section 16 divides the five images selected by the user into four groups corresponding to four pages. The five images selected by the user are thus arranged as shown in FIG. 10B, for example, so that one image is on 12 corresponding to group 1, two images on 2P corresponding to group 2, one image on 3P corresponding to group 3, and one image on 4P corresponding to group 4.

When the user selects seven images, the image dividing section 16 divides the seven images selected by the user into four groups in the same manner as above. The seven images selected by the user are thus arranged, for example, so that one image is on 12 corresponding to group 1, four images on 2P corresponding to group 2, one image on 3P corresponding to group 3, and one image on 4P corresponding to group 4.

Since the group 2 corresponding to 2P includes four images and exceeds the upper limit number of three, the image dividing section 16 subdivides the images through the first and second exception processing. As a result, the seven images selected by the user are arranged as shown in FIG. 10C, for example, so that one image is on 12 corresponding to group 1, three images on 2P corresponding to group 2, two images on 3P corresponding to group 3, and one image on 4P corresponding to group 4.

The warning generating section 24 generates a warning if the number of images in one group exceeds the upper limit number of images upon the selection of images made by the user through the image selecting section 22. Alternatively, the warning generating section 24 generates a warning if at least one of the first and second exception processing is performed.

Figure 10C:
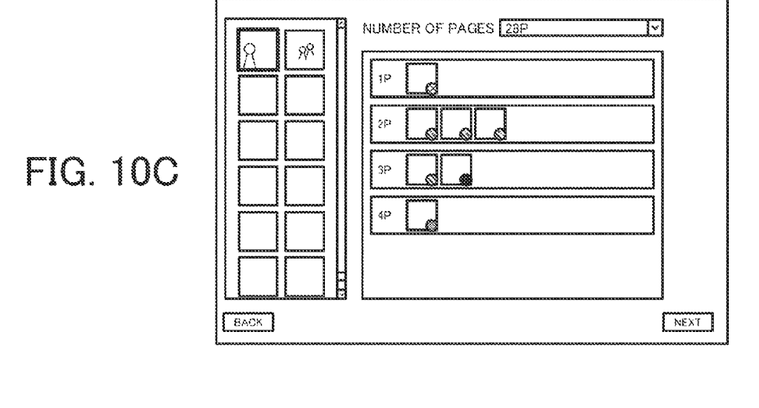

For example, when the number of images on 2P exceeds the upper limit number of images as shown in FIG. 10C, a warning message such as "The number of images on 2P exceeded the allowable value. The images included in 2P are divided into 2P and 3P. Is it OK?" is displayed on the display screen of the image display section 20.

When the user changes the number of pages of the photo book, the warning generating section 24 generates a warning if the number of images in each group exceeds the upper limit number of images in the corresponding page or at least one of the first and second exception processing is performed. For example, if the user reduces the number of pages, the number of images included in one page is increased and therefore the number of images in each group may exceed the upper limit number of images. Therefore, a warning is likewise generated if the number of images in each group exceeds the upper limit number of images.

By thus generating a warning, the user can find an excess group in which the number of images exceeds the upper limit number of images on one page and know that the subdivision processing is performed on the excess group.

The image processing method of the invention can be realized as an image processing program for causing a computer to execute each step of the image processing method. The image processing method may be realized as a computer readable recording medium having the image processing program recorded thereon.

The present invention is in no way limited to the above embodiments in which it is applied to photo books. The present invention is applicable not only to photo books (or photo albums) but calendars with a predetermined number of pages, Shuffle Prints (template-synthesized prints) with a predetermined number of pages, which prints have a predetermined number of images shuffled and printed at random on each page, or any other photo-content commodities having a predetermined number of mounts (including visible, physical ones such as photo books and invisible ones such as the photo book data to be processed on a computer).

The photo-content commodities having a predetermined number of mounts may take the form of a photo book with a plurality of mounts bound together, or the form of a set of mounts not bound together but separable from one another.

Mounts of such photo-content commodities are not limited to physical, printed matter. The mounts of so-called virtual contents under electronic representation as displayed on a display unit will also do.

The photo-content commodities as displayed on a display unit are included in the photo-content commodities of the present invention.

The page number acquiring section, as being an example of the mount number setting section of the invention, is adapted to set the mount number for the mounts on which the image arranging section arranges images at the mount number as inputted by a user.

In this regard, the mount number setting section of the invention is not limited to the above but may set the mount number for the mounts on which the image arranging section arranges images at the mount number as automatically specified according to at least one kind of photo-content commodities information selected from the number and resolution of the images as acquired in the image acquiring section (or the images as selected in the image selecting section) as well as the upper limit number of images arrangeable on each mount and the print size.

The mount number setting section may set the mount number for the mounts on which the image arranging section arranges images at, for instance, the minimum integer x (x is an integer number of equal to or larger than 1) that allows a number obtained by multiplying the upper limit number of images arrangeable on each mount or in each print by x to be equal to or larger than the number of the images as acquired in the image acquiring section.

If the upper limit number of images arrangeable on each mount or in each print is 8 and the number of the images as acquired in the image acquiring section is 30, the mount number setting section sets the mount number at 4, a value obtained from the calculation: 8×4=32.

It is also possible to determine the number of images arrangeable on one page in accordance with the print size and thereby set the mount number similarly to the above.

As an example, it is assumed that the number of images arrangeable on one page is 4 for normal, large-size prints, and 15 for A4-size prints. If the number of the images as acquired in the image acquiring section is 30 this time also, the mount number setting section sets the mount number for large-size prints at 8 based on the calculation: 4×8=32. For A4-size prints, the mount number setting section sets the mount number at 2 based on the calculation: 15×2=30.

It is also possible to set the mount number on the basis of the resolution of images.

If the images as acquired in the image acquiring section have a higher resolution and are accordingly less reduced in quality upon printing, the mount number can be set in a manner similar to the above. If the resolution is relatively low and, as a consequence, the image quality may be reduced upon printing, such processing as above is performed taking account of an image size not causing reduction in image quality.

To be more specific, if the resolution is relatively high, the number of images arrangeable on one page is determined as, for instance, 4 for large-size prints and 15 for A4-size prints, similarly to the above. If the resolution is relatively low, the image size is reduced in size in order not to reduce them in quality, so that the number of images arrangeable on one page is changed to 8 for large-size prints and 30 for A4-size prints.

In other words, a image size allowing a print of a specified image quality is determined in accordance with the resolution of the images as acquired in the image acquiring section, and the upper limit number of images arrangeable on each mount or in each print is determined in accordance with the determined image size.

It is desirable that the upper limit number of arrangeable images as specified for commodities chiefly used as an index, such as Shuffle Prints, is high, while that as specified for commodities chiefly adapted for appreciation of individual images, such as photo books, is low.

The mount number setting section may also set the mount number for the mounts on which the image arranging section arranges images at the page number as predetermined for specified photo-content commodities.

If the photo-content commodities in question present a calendar with twelve pages corresponding to twelve months, the mount number setting section sets the mount number at 12.

If the number of the images as included in a group, the group corresponding to 4-5P in FIG. 9 for instance, exceeds the upper limit number, the image display section desirably displays the group in an identifiable manner by changing the background color or the like.

In that case, it is desirable that the image dividing section is able to determine in response to the instructions as inputted by a user whether to perform the first exception processing or the image subdivision as instructed by the user as a selectively switched operation.

This invention is basically as described above.

While the image processing device, image processing method and image processing program of the invention has been described above in detail, the invention is not limited to the above embodiments and various improvements and modifications may be made without departing from the spirit and scope of the invention.

What is claimed is:

1. An image processing device for arranging a plurality of images on each of mounts, the image processing device comprising:
    an image acquiring section for acquiring the plurality of images;
    a mount number setting section for setting a mount number for the mounts;
    an image dividing section for dividing the plurality of images acquired in the image acquiring section into a predetermined number of groups based on accessory information of the plurality of images, with the predetermined number being equal to the mount number set in the mount number setting section; and an image arranging section for arranging images included in each of the predetermined number of groups after division in the image dividing section on each corresponding mount, wherein the image dividing section is adapted to divide the plurality of images into the predetermined number of groups so that a number of images included in each of the predetermined number of groups is not more than an upper limit number of images capable of being arranged on the corresponding mount.

2. The image processing device according to claim 1, wherein, when a number of images included in a first group exceeds the upper limit number, the image dividing section is adapted to perform a first exception processing comprising:

detecting one or more second groups adjacent to the first group satisfying a condition that a total number of images with the first group does not exceed a sum of upper limit numbers for images in the first group and the one or more second groups; and subdividing the images included in the first group into the first group and the one or more second groups so that a number of images included in each group is not more than the upper limit number.

3. The image processing device according to claim 1, wherein, when a number of images included in a first group exceeds the upper limit number, the image dividing section is adapted to perform a first exception processing comprising: detecting one or more second groups adjacent to the first group and a third group adjacent to the one or more second groups satisfying a condition that a total number of images does not exceed the upper limit number; combining images included in the one or more second groups and the third group as the third group; and subdividing the images included in the first group into the first group and the one or more second groups so that a number of images included in each of the first group and the one or more second groups is not more than the upper limit number.

4. The image processing device according to claim 2, wherein, when the one or more second groups cannot be detected, the image dividing section is adapted to perform a second exception processing comprising: uniformly subdividing the plurality of images into the predetermined number of groups irrespective of the accessory information so that a number of images included in each of the predetermined number of groups is not more than the upper limit number.

5. The image processing device according to claim 3, wherein, when the one or more second groups and the third group cannot be detected, the image dividing section is adapted to perform a second exception processing comprising: uniformly subdividing the plurality of images into the predetermined number of groups irrespective of the accessory information so that a number of images included in each of the predetermined number of groups is not more than the upper limit number.

6. The image processing device according to claim 1, wherein, when a number of images included in a first group exceeds the upper limit number, the image dividing section is adapted to perform a second exception processing comprising: uniformly subdividing the plurality of images into the predetermined number of groups irrespective of the accessory information so that a number of images included in each of the predetermined number of groups is not more than the upper limit number.

7. The image processing device according to claim 4, wherein the image dividing section is adapted to shift, based on shooting time information included in the accessory information, one or more images adjoining a boundary between two adjacent groups after the second exception processing to a group including images having a closer shooting time so that a number of images included in each of the two adjacent groups is not more than the upper limit number.

8. The image processing device according to claim 1, further comprising an image display section for displaying a mount having images arranged in the image arranging section.

9. The image processing device according to claim 2, further comprising an image display section for displaying a mount having images arranged in the image arranging section, wherein the image display section is adapted to display a group having included each of images to be subdivided in an identifiable manner upon image subdivision.

10. The image processing device according to claim 1, further comprising:

an image selecting section for enabling a user to select one or more images to be divided into groups in the image dividing section from among the plurality of images acquired in the image acquiring section; and a warning generating section for generating a warning upon selection of the one or more images made by the user through the image selecting section, if a number of images included in one of groups corresponding to the selected one or more images exceeds the upper limit number.

11. The image processing device according to claim 4, further comprising:

an image selecting section for enabling a user to select one or more images to be divided into groups in the image dividing section from among the plurality of images acquired in the image acquiring section; and a warning generating section for generating a warning upon selection of the one or more images made by the user through the image selection section, if at least one of the first exception processing and the second exception processing is performed on one of groups corresponding to the selected one or more images.

12. The image processing device according to claim 1, further comprising a warning generating section for generating a warning if a number of images included in each group after the mount number setting section changes the mount number exceeds the upper limit number.

13. The image processing device according to claim 4, further comprising a warning generating section for generating a warning if at least one of the first exception processing and the second exception processing is performed after the mount number setting section changes the mount number.

14. The image processing device according to claim 1, wherein the mount number setting section is adapted to set the mount number for the mounts at a mount number inputted by a user.

15. The image processing device according to claim 1, wherein the mount number setting section is adapted to set the mount number for the mounts at a mount number specified according to at least one kind of photo-content commodities information selected from a number and a resolution of the plurality of images acquired in the image acquiring section as well the upper limit number of images capable of being arranged on each of the mounts and a print size.

16. The image processing device according to claim 15, wherein the mount number setting section is adapted to set the mount number for the mounts at a minimum integer x of one or larger that allows a number obtained by multiplying the upper limit number of images capable of being arranged on each of the mounts by x to be equal to or larger than the number of the plurality of images acquired in the image acquiring section.

17. The image processing device according to claim 16, wherein an image size allowing a print of a specified image quality is determined in accordance with the resolution of the plurality of images acquired in the image acquiring section, and the upper limit number of images capable of being arranged on each of the mounts is determined in accordance with the determined image size.

18. The image processing device according to claim 15, wherein the mount number setting section is adapted to set the mount number for the mounts at a minimum integer x of one or larger that allows a number obtained by multiplying the upper limit number of images capable of being arranged in each print by x to be equal to or larger than the number of the plurality of images acquired in the image acquiring section.

19. The image processing device according to claim 18, wherein an image size allowing a print of a specified image quality is determined in accordance with the resolution of the plurality of images acquired in the image acquiring section, and the upper limit number of images capable of being arranged in each print is determined in accordance with the determined image size.

20. The image processing device according to claim 1, wherein the mount number setting section is adapted to set the mount number for the mounts at a page number predetermined for specified photo-content commodities.

21. The image processing device according to claim 2, further comprising an image display section for displaying a mount having images arranged in the image arranging section,
wherein the image display section is adapted to display the first group in an identifiable manner if the number of the images included in the first group exceeds the upper limit number, and
wherein the image dividing section is adapted to determine in response to instructions inputted by a user whether to perform the first exception processing or image subdivision as instructed by the user.

22. The image processing device according to claim 1, wherein the mounts are a photo book with a predetermined number of pages, a calendar with a predetermined number of pages, or a Shuffle Print with a predetermined number of pages which has a predetermined number of images shuffled and printed at random on each page.

23. An image processing method for arranging a plurality of images on each of mounts, the image processing method comprising:
an image acquiring step of acquiring the plurality of images;
a mount number setting step of setting a mount number for the mounts;
an image dividing step of dividing the plurality of images acquired in the image acquiring step into a predetermined number of groups based on accessory information of the plurality of images, with the predetermined number being equal to the mount number set in the mount number setting step; and
an image arranging step of arranging images included in each of the predetermined number of groups after division in the image dividing step on each corresponding mount,
wherein the image dividing step divides the plurality of images into the predetermined number of groups so that a number of images included in each of the predetermined number of groups is not more than an upper limit number of images capable of being arranged on the corresponding mount.

24. A non-transitory computer readable recording medium having recorded thereon an image processing program for causing a computer to execute each step of the image processing method according to claim 23.

* * * * *